United States Patent [19]
Ogura

[11] Patent Number: 6,052,370
[45] Date of Patent: Apr. 18, 2000

[54] MOVING IMAGE COMMUNICATION SYSTEM AND METHOD FOR PERFORMING IMAGE COMMUNICATION

[75] Inventor: Naoyuki Ogura, Tokyo, Japan

[73] Assignee: NEC Corporation, Tokyo, Japan

[21] Appl. No.: 08/884,320

[22] Filed: Jun. 27, 1997

[30] Foreign Application Priority Data

Jun. 28, 1996 [JP] Japan ...................................... 8-169654

[51] Int. Cl.[7] ........................................................ H04J 3/26
[52] U.S. Cl. ............................................ 370/389; 370/474
[58] Field of Search ..................................... 370/389, 394, 370/412, 474

[56] References Cited

FOREIGN PATENT DOCUMENTS

| | | |
|---|---|---|
| 4-35135 | 5/1992 | Japan . |
| 4-319832 | 11/1992 | Japan . |
| 5-14408 | 1/1993 | Japan . |
| 5-14763 | 1/1993 | Japan . |
| 5-37549 | 2/1993 | Japan . |
| 5-83694 | 4/1993 | Japan . |

OTHER PUBLICATIONS

Japanese Office Action dated—May 13, 1998, and partial translation thereof, for Japanese Application JP 8–169654.

*Primary Examiner*—Melvin Marcelo
*Attorney, Agent, or Firm*—McGinn & Gibb, P.C.

[57] ABSTRACT

To increase access speed, a moving image communication system includes a transmitter for outputting a packet including a predetermined number of subpackets containing a first information and a second information, and a receiver for receiving the packet. The receiver includes a memory for storing the first information, a counter for counting a number of the first information read out from the memory, an image processor for receiving the first information from the memory, and for generating an output signal of the receiver based on the first information, and a controller for controlling the image processor to output the output signal, when the counter counts the predetermined number.

19 Claims, 10 Drawing Sheets

MOVING IMAGE COMMUNICATION SYSTEM AND METHOD FOR PERFORMING IMAGE COMMUNICATION

BACKGROUND OF THE INVENTION

The present invention generally relates to a moving image (e.g., a video image) communication system, and more particularly to a moving image communication system having a transmitter for converting image data to a data packet which has a suitable format for transmission and transmitting the packet, and a receiver for receiving the packet data and for outputting data to a display (e.g., a monitor) by using the packet.

DESCRIPTION OF THE RELATED ART

In a moving image communication system using a high-speed packet switching network with an asynchronous mode, generally, when communication traffic (e.g., a transfer of data) increases in the network, the data being transferred may be lost, because of a collision between the data or an overflow of the data.

If such a loss occurs, the reproduced image quality is deteriorated in a packet receiver for receiving and processing moving images transmitted through the high-speed packet switching network. Accordingly, a receiver for receiving the data must compensate for the missing data to maintain the quality of the reproduced image.

FIGS. 1(a)–3 show a conventional moving image communication system disclosed in Japanese Patent Application Laid-open No. 4-35135.

Figure 1A:
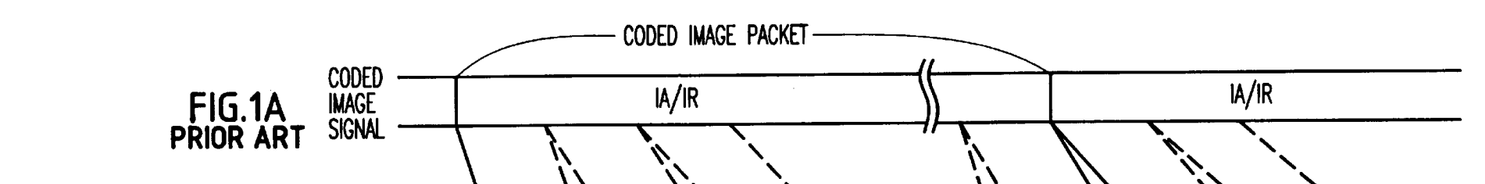
FIGS. 1(a)–1(c) illustrate a conventional packet format.
Figure 1B:
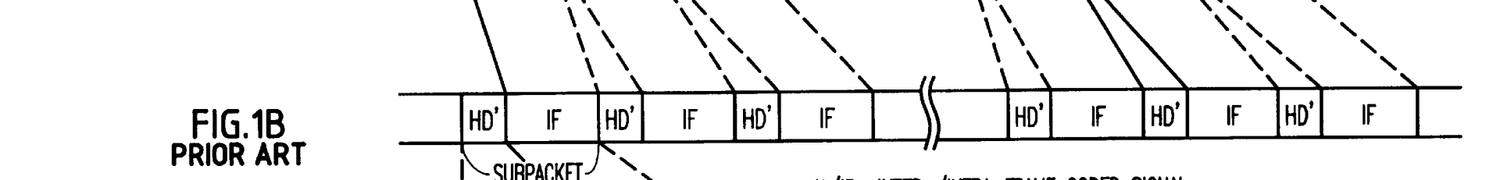
Figure 1C:
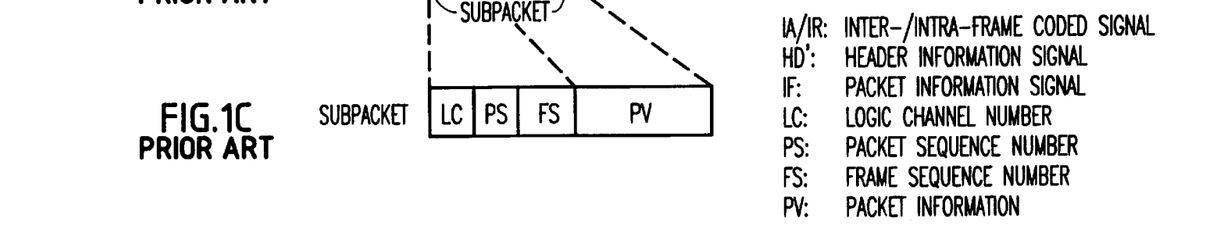

A conventional packet has a format as shown in FIGS. 1(a)–1(c). First, the conventional packet multiplexer 1 generates a coded image signal as shown in FIG. 1(a) by using each of image input signals (1)–(n) (e.g., wherein n is an integer). If there is no data loss, the image coded signal corresponds to a format of data from each of buffer memories 62-1–62-n in FIG. 2.

Figure 2:
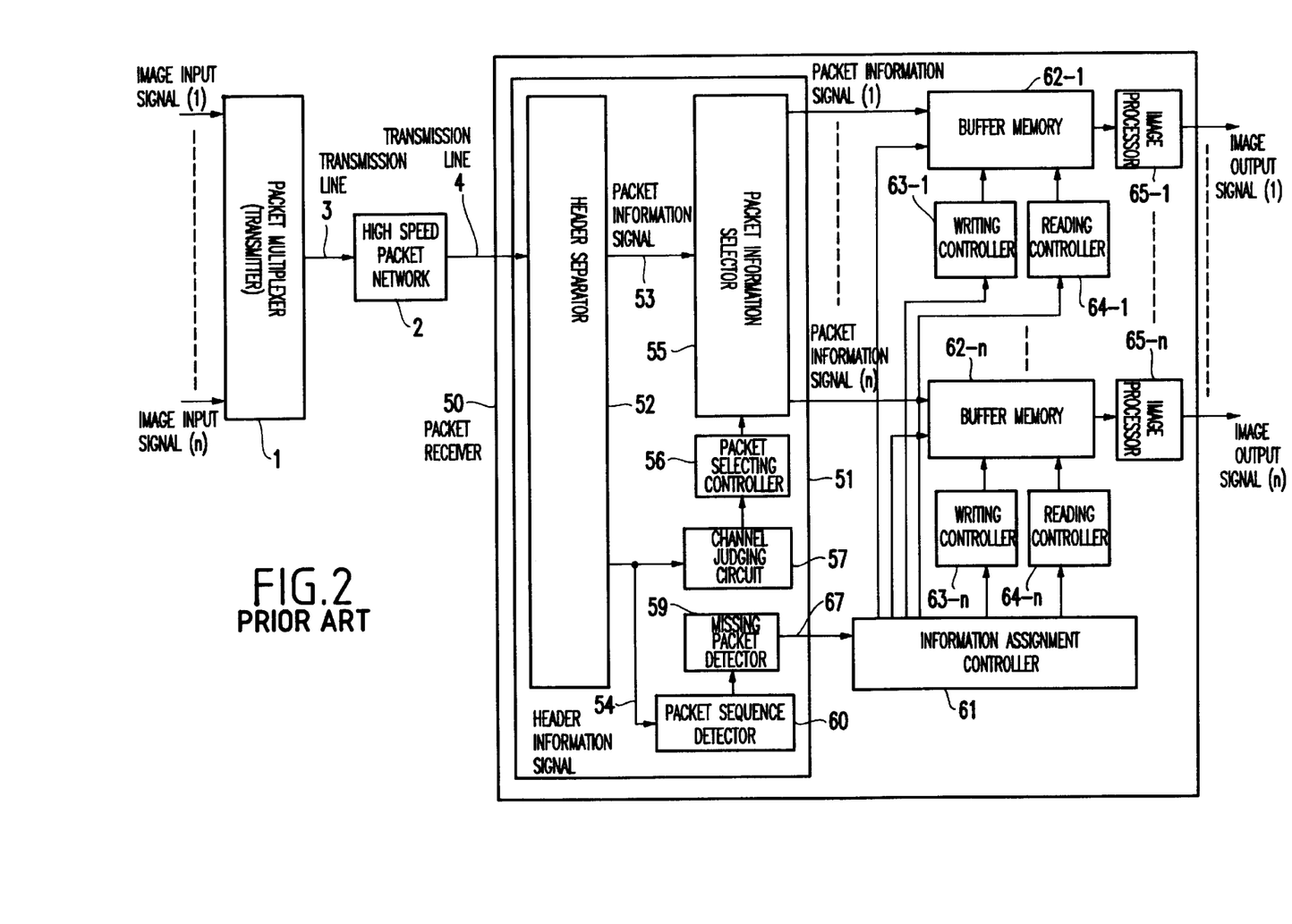
FIG. 2 illustrates a conventional moving image communication system.

Secondly, as shown in FIG. 1(b), the packet multiplexer 1 shown in FIG. 2 inserts a plurality of headers HD' into the coded image signal, and outputs the signal shown in FIG. 1(b) to the transmission line 3. As a result, one coded image packet includes a plurality of subpackets each having a header HD' and a packet information signal IF. The packet information signal IF includes information about image data, and includes a predetermined number of bits.

The header HD' includes, as shown in FIG. 1(c), a logic channel number LC, a packet sequence number PS, and a frame sequence number FS. The logic channel number LC includes information concerning which image input signal among the image input signals (1)–(n) is used for making the subpacket.

The packet sequence number PS has information (e.g., a number) indicating the position in the packet. For example, if one packet includes first, second, third, . . . , and i-th (e.g., wherein i is an integer) subpackets sequentially, the packet sequence number PS of the first subpacket is 1, the packet sequence number PS of the second subpacket is 2, the packet sequence number PS of the third subpacket is 3, . . . , and the packet sequence number PS of the i-th subpacket is i.

The frame sequence number FS includes information about the packet. For example, if the coded image signal includes a first packet, a second packet, . . . , and j-th (e.g., wherein j is an integer) packet sequentially, a frame sequence number FS of the first packet is 1, a frame sequence number FS of the second packet is 2, . . . , and a frame sequence number FS of the j-th packet is j. Thus, in the same packet, the frame sequence number FS of the subpackets is the same.

The packet information PV is the same as the packet information signal IF.

FIG. 2 shows a conventional moving image communication system. The conventional moving image communication system includes a packet multiplexer 1 (e.g., transmitter) for receiving a plurality of image input signals, converting the image input signals to a packet, and outputting the packet to a transmission line 3, a high-speed packet network 2 for transferring the packet transmitted through the transmission line 3 in an asynchronous transfer mode (ATM), a transmission line 4 for receiving the packet from the high-speed packet network 2 and for transmitting the packet to a packet receiver 50, which converts the packet to a plurality of image output signals suitable for a display (e.g., a monitor).

Moreover, the packet receiver 50 includes a packet decomposing circuit 51, an information assignment controller 61, buffer memories 62-1–62-n (e.g., wherein n is an integer), writing controllers 63-1–63-n, reading controllers 64-1–64-n, and image processors 65-1–65-n.

Further, the packet decomposing circuit 51 includes a header separator 52, a packet information selector 55, a packet selecting controller 56, a channel judging circuit 57, a packet sequence detector 60, and a packet missing detector 59.

Figure 3:
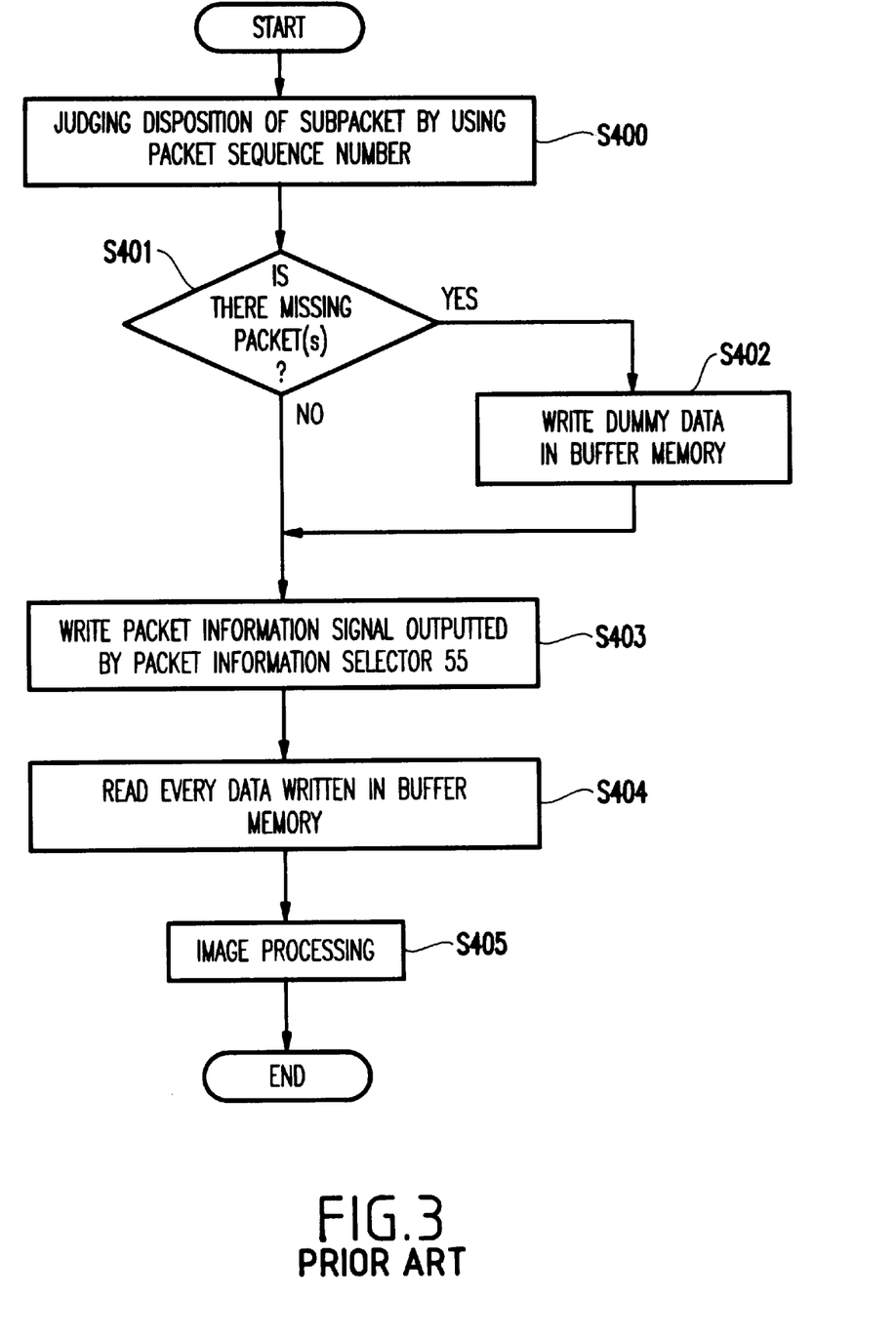
FIG. 3 is a flowchart for explaining the operation of the system shown in FIG. 2.

The operation for compensating for lost/missing packets is described below using FIGS. 2 and 3.

The header separator 52 separates a header HD' from a subpacket, outputs a packet information signal IF to the packet information selector 55, and outputs the header HD' to the channel judging circuit 57 and the packet sequence detector 60.

The packet sequence detector 60 extracts the packet sequence number PS in the header HD', and outputs the packet sequence number PS to the missing packet detector 59.

The missing packet detector 59 judges whether a packet sequence number PS sequentially follows a previous packet sequence number PS corresponding to the same logic channel number LC (step S400). If the packet sequence number is not continuous (e.g., sequential), the missing packet detector 59 outputs a detection signal 67 to the information assignment controller 61 (step S401). For example, if the packet sequence number currently being input is 14, and the previous packet sequence number corresponding to the same logic channel is 11, it is determined that subpackets with the packet sequence numbers 12 and 13 have been lost (e.g., are missing).

When a subpacket is determined to be lost in step S401, pseudo-packets (e.g., dummy data) are written in a buffer memory 62-1(n) corresponding to the logic channel number LC by the information assignment controller 61 (step S402).

When a subpacket is determined not to be lost in step S401, or after the control is performed in step S402 to write a pseudo-packet, a packet information signal outputted from the packet information selector 55 is written in the buffer memory 62-1(n) by the writing controller, which is controlled by the information assignment controller 61 (step S403).

Then, the information assignment controller 61 controls the buffer memory 62-1(n) to output the image packet information signals or dummy data stored in the buffer memory by using the reading controller 64-1(n) (step S404).

The image processor outputs an image output signal having an approximate value calculated by using the dummy data, if some packet(s) are missing (S405).

However, the conventional image communication system cannot use a more simplified format, because every subpacket must contain, at least, the packet sequence number PS for compensating for packet loss. Clearly, a simplified format is preferable for obtaining data faster, because the number of bits included in the subpacket is smaller than that of the conventional format, although a number of bits of the packet information signal IF of the simplified format is the same as that of the conventional format.

Moreover, when the access speed for writing data to the buffer memory is slower than the access speed for reading data from the buffer memory, the conventional communication system requires much time from receiving a packet to outputting image output signals (1)–(n), because dummy data must be written in the buffer memory if there. is any packet loss.

Hence, the moving image communication system cannot output image output signals (1)–(n) with high-speed. This is a problem.

SUMMARY OF THE INVENTION

In view of the foregoing and other problems of the conventional structure, it is therefore an object of the present invention to provide an improved moving image communication system.

It is another object of the present invention to provide an improved moving image communication method.

In a first aspect, a moving image communication system, according to the present invention, includes a transmitter for outputting a packet including a predetermined number of subpackets containing a first information and a second information, and a receiver for receiving the packet. The receiver includes a memory for storing the first information, a counter for counting a number of the first information read out from the memory, an image processor for receiving the first information from the memory, and for generating an output signal of the receiver based on the first information, and a controller for controlling the image processor to output the output signal, when the counter counts the predetermined number.

With the unique and unobvious structure of the present invention, the counter counts a number of the first information read out from the memory. Therefore, access speed becomes faster than the conventional system shown in FIG. 2, because a more simplified packet format is used in the present invention. Further, the conventional packet missing detector 59 and the conventional packet sequence detector 60, as shown in FIG. 2, are unnecessary in the present invention. Therefore, the moving image communication system in the present invention is smaller than the conventional system shown in FIG. 2.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Referring now to the drawings, and more particularly to FIGS. 4(a)–6, a moving image communication system is shown according to a first embodiment of the present invention.

Figure 4A:
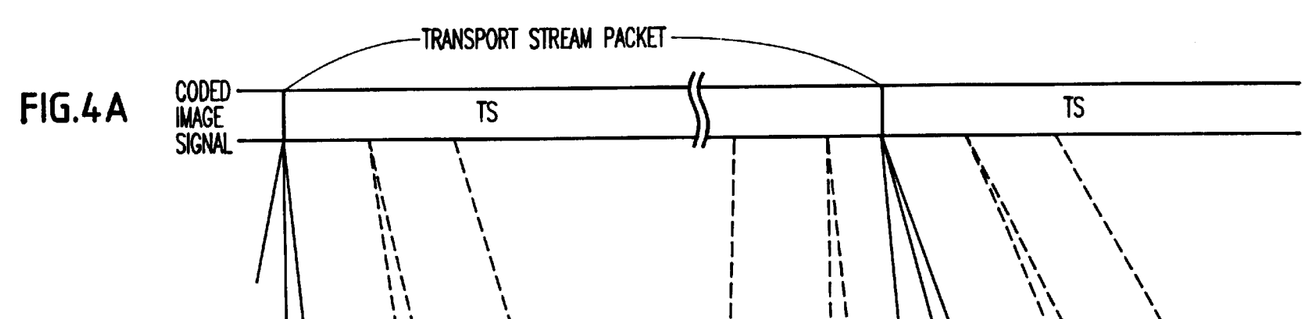
FIGS. 4(a)–4(c) illustrate a packet format according to the present invention.
Figure 4B:
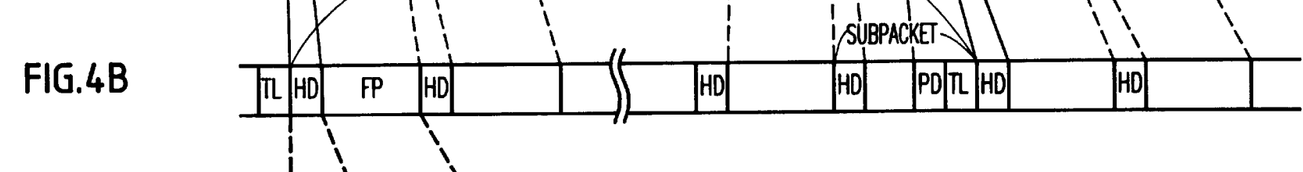
Figure 4C:
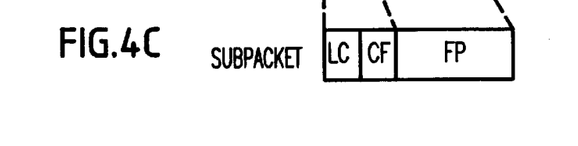

FIGS. 4(a)–4(c) show a packet format according to the invention. First, a packet multiplexer 1 (e.g., transmitter) shown in FIG. 5 generates a coded image signal as shown in FIG. 4(a) by using each of image input signals (1)–(n) (e.g., wherein n is an integer). If there is no packet loss, the coded image signal corresponds to a format of data from each buffer memory 14-1–14-n in FIG. 5.

Figure 5:
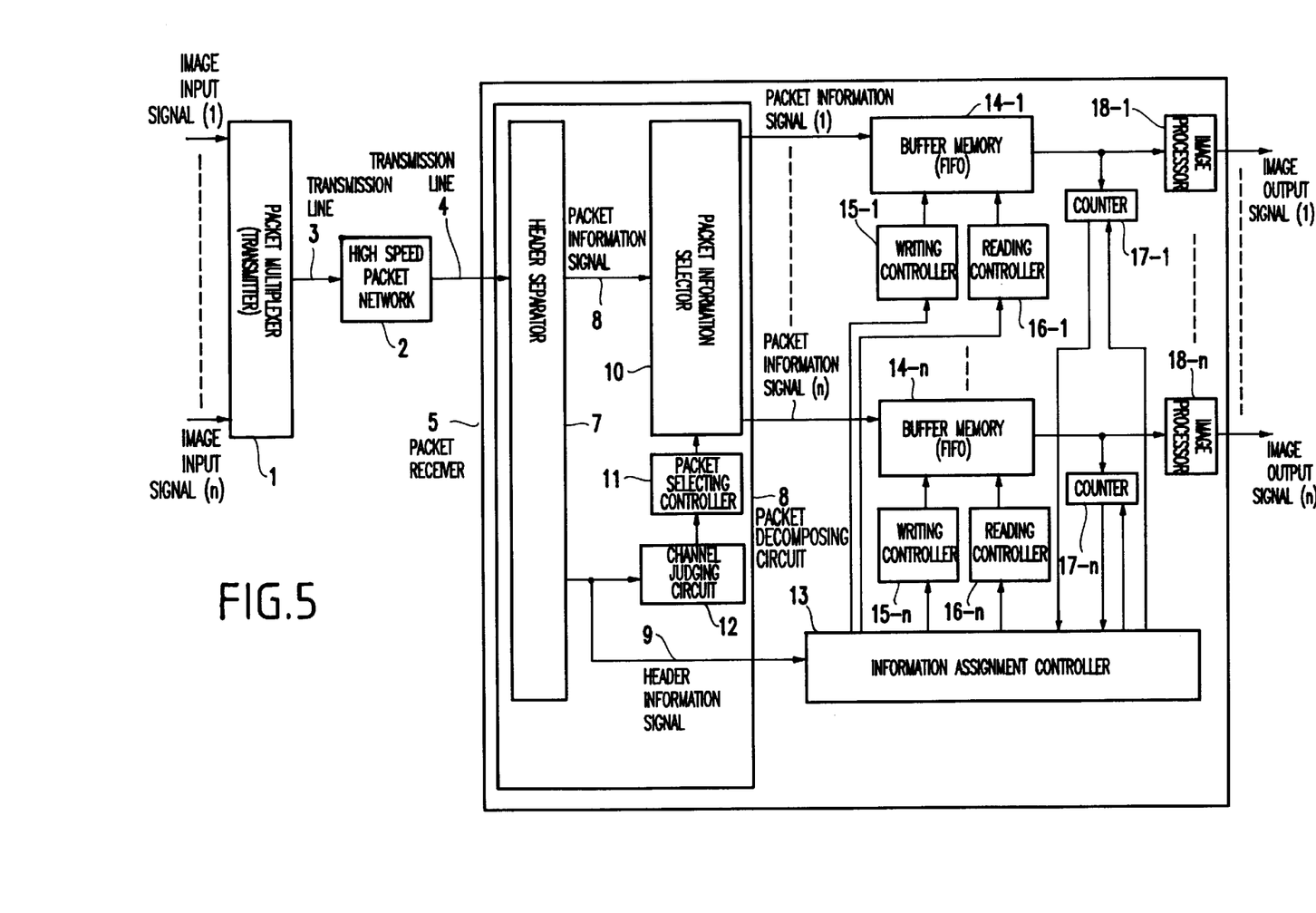
FIG. 5 illustrates a moving image communication system according to a first embodiment of the present invention.

Secondly, as shown in FIG. 4(b), the packet multiplexer 1 shown in FIG. 5 inserts a plurality of headers HD into the coded image signal, and outputs the signal shown in FIG. 4(b) to the transmission line 3. As a result, one transport stream packet includes a plurality of subpackets (e.g., the number is predetermined), each having a header HD and a packet information signal FP. The packet information signal FP includes information about image data, and includes a predetermined number of bits.

The header HD includes, as shown in FIG. 4(c), a logic channel signal LC and a continuation flag CF. The logic channel signal LC includes information concerning which image input signal among the image input signals (1)–(n) is used for making the subpacket.

The continuation flag CF includes information as to whether a subpacket included in a transport stream packet is a last subpacket (e.g., a subpacket positioned at the end of the transport stream packet). For example, the continuation flag CF has an active level (e.g., "1") if the subpacket is the last subpacket, and the continuation flag CF has an inactive level (e.g., "0") if the subpacket is not the last subpacket. Thus, preferably, only one bit is required for the continuation flag CF. A transmission frame is formed from one or more subpackets.

In this exemplary embodiment, one transport stream packet is stored in one transmission frame. However, one transmission frame may be arranged to store a plurality of transport stream packets.

Additionally, the image packet information signal for the last one of the subpackets forming the transmission frame includes a control signal TL for controlling the transmission frame.

The padding signal PD is data inserted having a length (Z−(X+Y)), where X is a number remaining when a number of bits of the transport stream packet TS is divided by a number of bits of the subpacket, Y is a number of bits of the control signal TL, and Z is a number of bits of the packet information signal FP.

FIG. 5 illustrates the moving image communication system according to the first embodiment of the invention.

The moving image communication system includes a packet multiplexer 1 (e.g., transmitter) for receiving a plurality of image input signals, converting the image input signals to a packet, and outputting the packet to a transmission line 3, a high-speed packet network 2 for transferring the packet transmitted through the transmission line 3 in an asynchronous transfer mode (ATM), a transmission line 4 for receiving the packet from the high-speed packet network 2 and for transmitting the packet to a packet receiver 5. The packet receiver 5 converts the packet into a plurality of image output signals suitable for a display (e.g., monitor).

Moreover, the packet receiver 5 includes a packet decomposing circuit 6, an information assignment controller 13, buffer memories 14-1–14-n (e.g., wherein n is an integer), writing controllers 15-1–15-n, reading controllers 16-1–16-n, and image processors 18-1–18-n.

Further, the packet decomposing circuit 6 includes a header separator 7, a packet information selector 10, a packet selecting controller 11, and a channel judging circuit 12.

The packet from the transmission line 4 is received by the packet header separator 7, where it is separated (e.g., decomposed) into a packet information signal 8 and a header information signal 9. Then, the packet information signal 8 is outputted to the packet information selector 10. On the other hand, the header information signal 9 is outputted to the channel judging circuit 12 and the information assignment controller 13.

The channel judging circuit 12 extracts a channel signal LC from the header information signal 9, and outputs the channel signal LC to the packet selecting controller 11. The packet selecting controller 11 generates a selection control signal corresponding to a channel (e.g., there are n channels in the first embodiment) of the packet information signal 8, and outputs the selection control signal to the packet information selector 10.

The packet information selector 10 reassembles the packet information signal 8 in a transport stream packet TS corresponding to each of the channels in response to the selection control signal from the packet selecting controller 11. Then, the packet information selector 10 outputs the transport stream packet TS as a corresponding packet information signal among packet information signals (1)–(n).

The buffer memories 14-1–14-n preferably are first-in-first-out (FIFO) buffers. The packet information signals (1)–(n) are respectively written in corresponding buffer memories (1)–(n) by the corresponding writing controllers 15-1–15-n, because the information assignment controller 13 judges a channel by using the channel signal LC and controls writing a packet information signal FP corresponding to the channel by a corresponding writing controller. Similarly, the information assignment controller 13 controls reading a packet information signal FP stored in a buffer memory by a corresponding reading controller.

Each of the buffer memories 14-1–14-n has a storage capacity larger than the number of bits of one transport stream packet TS. Preferably, the storage capacity is n (where n is a positive integer) times larger than the number of bits of the transport stream packet TS for easily accessing the buffer memories 14-1–14-n.

The image processors 18-1–18-n receive data from the buffer memories 14-1–14-n, process the data, and output the processed data externally of the system (e.g., a display, monitor, etc.) synchronously with the image output signals (1)–(n)(packet synchronization).

The counters 17-1–17-n count a number of packet information signals FP outputted from corresponding buffer memories 14-1–14-n to a corresponding image processor 18-1–18-n. For example, first, the counters 17-1–17-n are initialized to a predetermined number of subpackets included in one transport stream packet TS. Then, the counters 17-1–17-n are decremented (e.g., by 1) from the present value whenever data is outputted from the corresponding buffer memories 14-1–14-n to the corresponding image processors 18-1–18-n. If the value of the counter is 0 before being decremented, the next value becomes the predetermined number.

Figure 6:
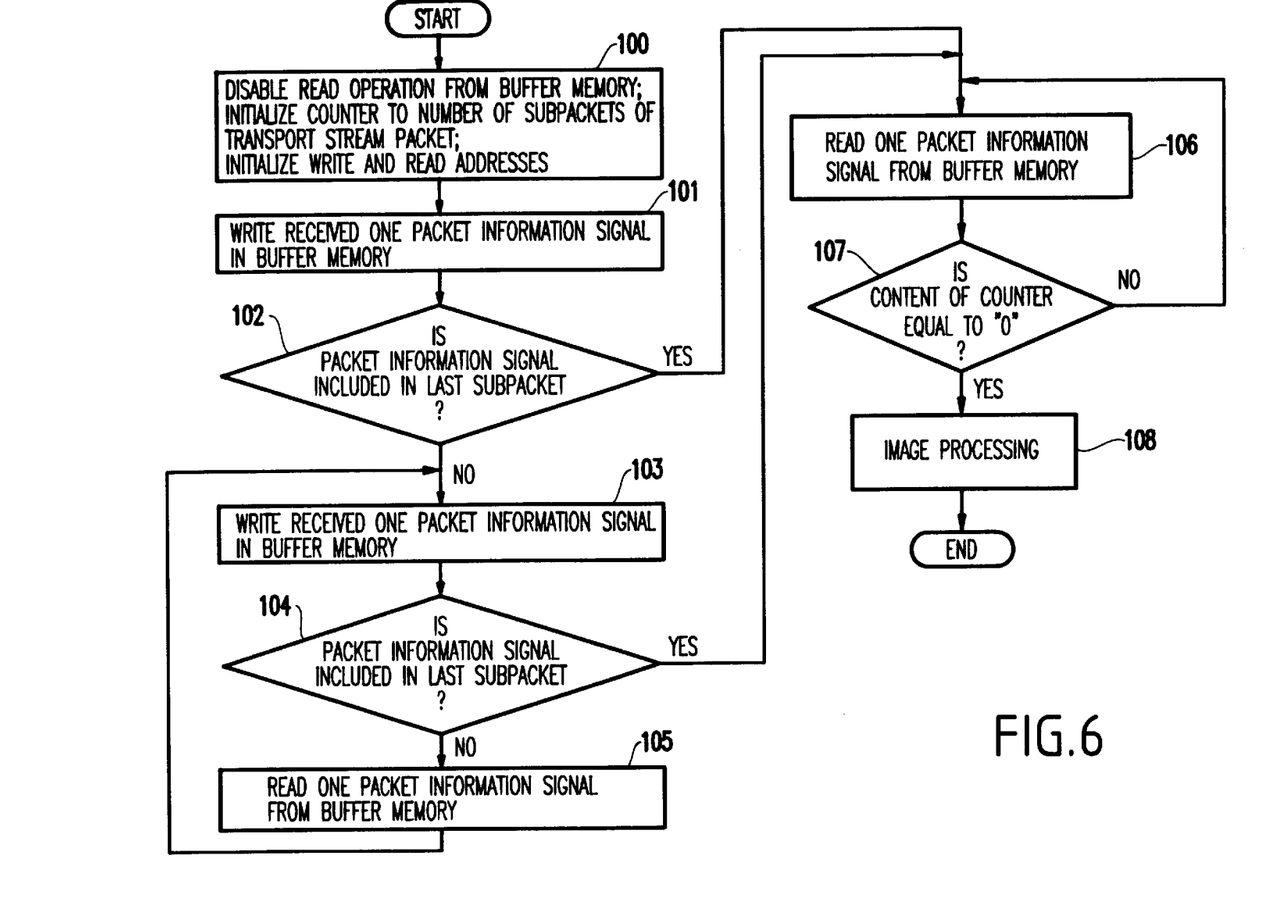
FIG. 6 is a flowchart for explaining the operation of the system shown in FIG. 5.

FIG. 6 shows a flowchart for explaining an operation according to the first embodiment of the present invention. For example, an operation for a channel 1 is explained hereinbelow.

The information assignment controller 13 disables an operation of reading data from the buffer memory section 14-1 by controlling the reading controller 16-1, and initializes the read and write addresses in the buffer memory 14-1, and initializes a content of the counter 17-1 to the number of subpackets in the transport stream packet (TS) (step S100).

Then, the information assignment controller 13 controls the writing controller 15-1 to write a packet information signal FP, which is outputted from the packet information selector 10, in the buffer memory 14-1 (step S101).

The information assignment controller 13 judges the continuation flag CF in the header information signal 9, to determine whether the packet information signal FP written in step S101 is contained in the last subpacket of the transmission frame (step S102). Clearly, step S102 is a step corresponding to the transmission frame when all subpackets except for the last one are missing (lost).

In step S102, if the image packet information signal FP written in step S101 is not contained in the last subpacket included in the transmission frame, the information assignment controller 13 controls the writing controller 15-1 to write the packet information signal FP, outputted from the packet information selector 10, to the buffer memory 14-1 (step S103).

Then, the information assignment controller 13 judges the continuation flag CF in the header information signal 9, to determine whether the packet information signal FP written in step S101 is contained in the last subpacket of the transmission frame (step S104).

In step S104, if the packet information signal FP written in step S103 is not included in the last subpacket, the information assignment controller 13 controls the reading controller 16-1 to read a packet information signal from the buffer memory 14-1 (step S105). The packet information signal read from the buffer memory 14-1 is outputted to the image processor 18-1. Accordingly, the counter 17-1 is decremented by one.

In steps S102 and S104, if the packet information signal FP written in the buffer memory 14-1 is included in the last subpacket, the information assignment controller 13 controls the reading controller 16-1 to read one packet information signal FP from the buffer memory 14-1 (step S106). The packet information signal read from the buffer memory 14-1 is outputted to the image processor 18-1. Accordingly, the counter 17-1 is decremented by one.

Then, the information assignment controller 13 judges whether the content of the counter 17-1 is zero (e.g., "0") (step S107).

If the content of the counter 17-1 is not zero, as determined in step S107, the process returns back to step S106 to continue processing.

On the other hand, if the content of the counter 17-1 is zero, as determined in step S107, the image processor 18-1 remakes the transport stream packet TS by combining the packet information signals FP outputted from the buffer memory 14-1, remakes the transport stream packet to a suitable form for an external device (e.g., display, monitor), and outputs a signal having the suitable form as an image output signal (1) in synchronization with the other image processors 18-2–18-n (packet synchronization)(step S108).

As mentioned above, when a subpacket is not lost, the count value becomes zero when the packet information signal FP included in the last subword of the transport stream packet TS is read. Therefore, the padding signal PD and the control signal TL can be eliminated.

Additionally, when loss of a subpacket occurs, the read operation from the corresponding buffer memory continues until the content of the corresponding counter becomes zero, although some information is missing. Therefore, the corresponding image processor receives correct data included in the transport stream packet TS and incorrect data not included in the transport stream packet TS. The incorrect data is called "garbage data", because it is previous data remaining in the corresponding buffer memory.

While processing of the packet information signal (1) is described above, the same processing is executed for the other packet information signals (2)–(n), simultaneously.

As mentioned above, when loss of a subpacket occurs, the packet synchronization is executed for the respective transport stream packets TS in the image processors 18-1–18-n, and therefore, the reproduced image quality can be maintained.

Additionally, according to the operation from step S101 to step S105, when there is no subpacket loss, special devices for eliminating the padding signal PD and the control signal TL are not required, since the count value becomes zero when the last word of the transport stream packet TS is read out.

Further, a packet selecting controller and a channel judging circuit shown in FIG. 2 are unnecessary.

Therefore, the moving image communication system according to the first embodiment can be fabricated more compactly than that of the conventional system. Also, the access speed of the moving image communication system according to the first embodiment becomes faster than that of the conventional system because a more simplified format is used in the present invention.

Figure 7:
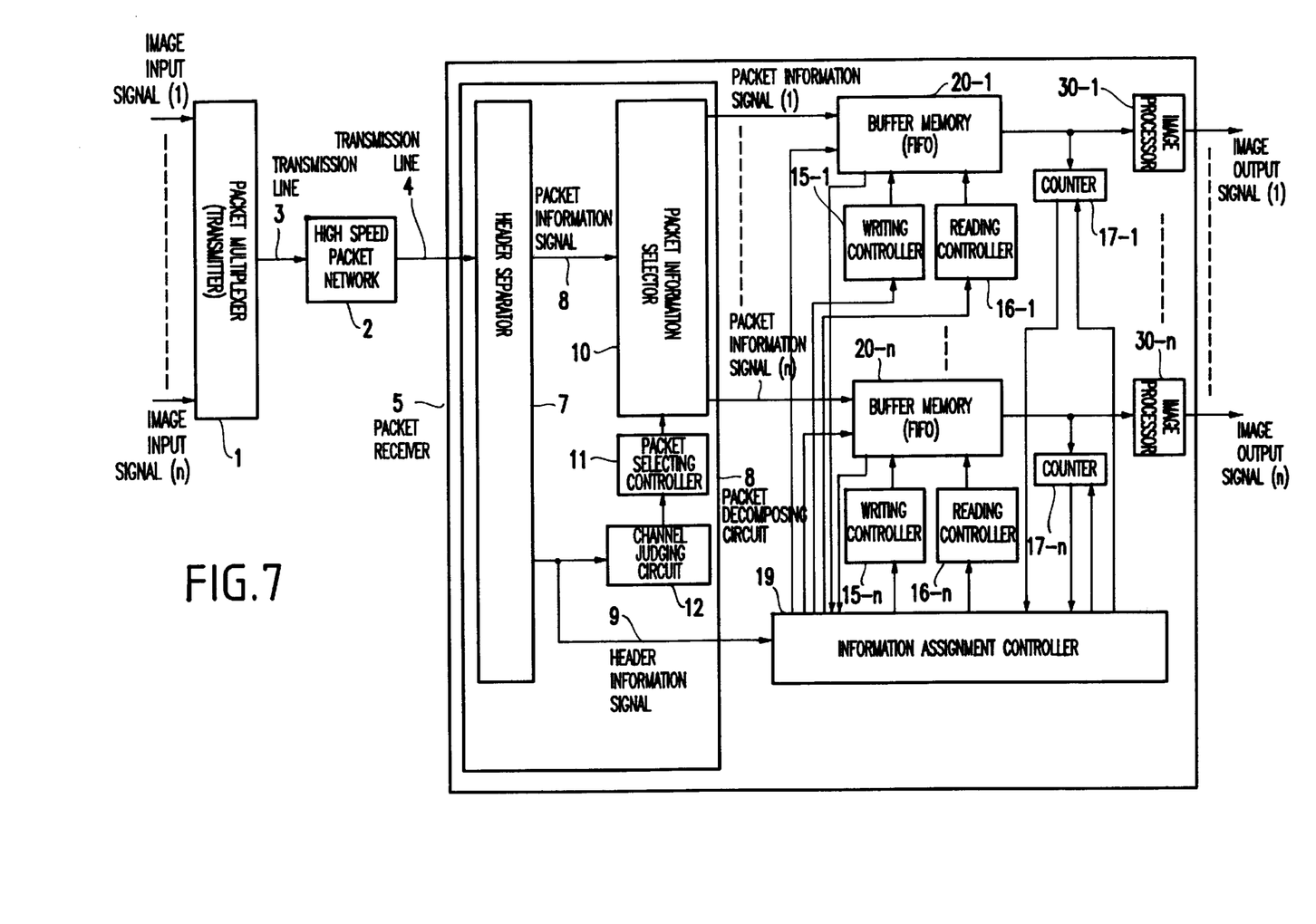
FIG. 7 illustrates a moving image communication system according to a second embodiment of the present invention.
Figure 8:
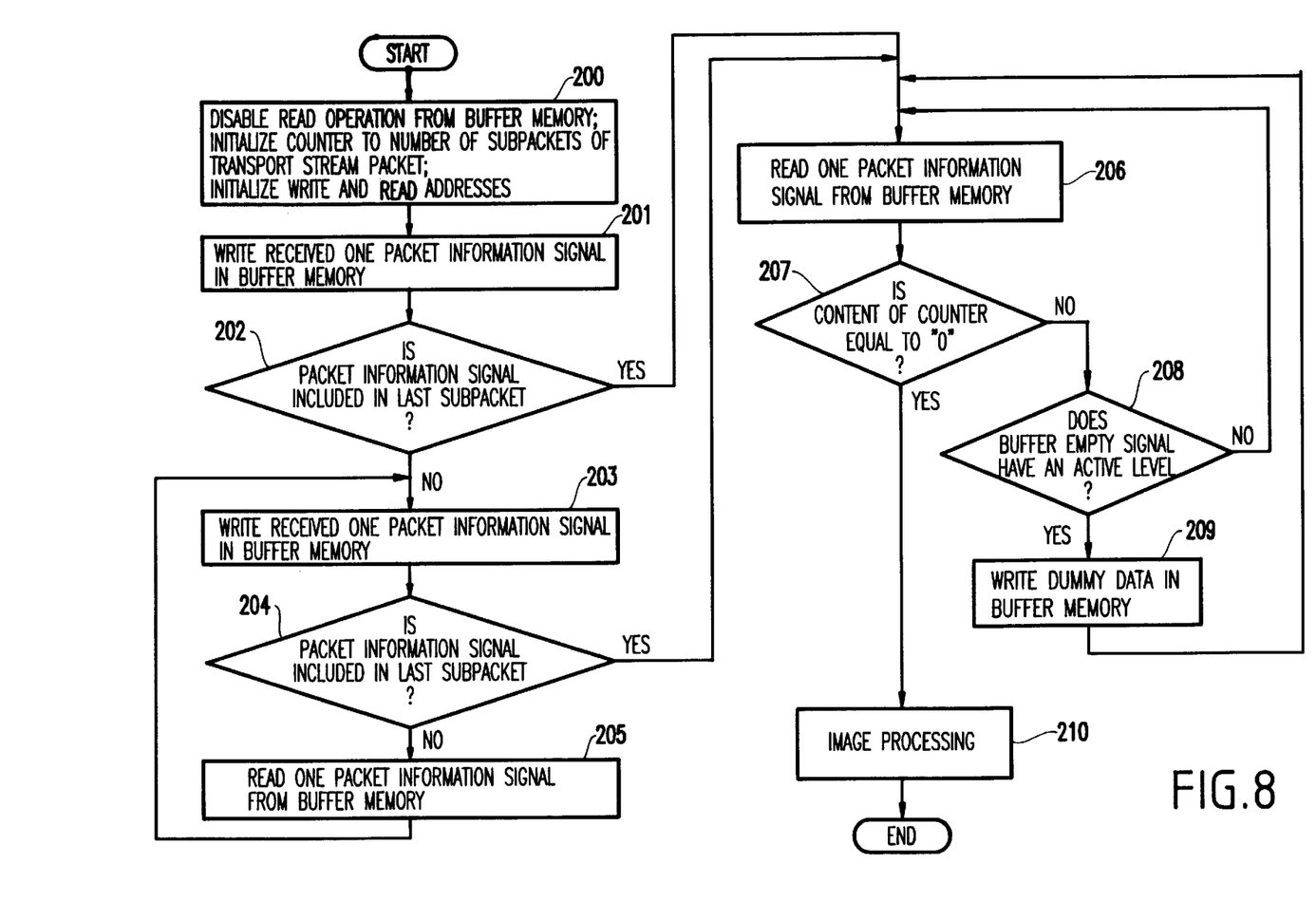
FIG. 8 is a flowchart for explaining the operation of the system shown in FIG. 7.

FIGS. 7 and 8 show a second embodiment of the present invention. The same parts in FIG. 7 as those in FIG. 2 are numbered with the same reference numerals in FIG. 2, and for brevity, explanations of these parts are omitted from the following description. The same packet format shown in FIGS. 4(a)–4(c) is used in the second embodiment.

In FIG. 7, a respective buffer memory 20-1–20-n outputs an empty signal having an active level (e.g., "1") to the information assignment controller 19 when all data, which is included in one transport stream packet TS, written in the buffer memory is read from the buffer memory. At this time, the information assignment controller 19 controls the writing controller to write a dummy data, which has a suitable form for the image processor to arrange the data approximately as the image output signal, in the buffer memory 20-1(n).

Further, the respective buffer memory 20-1–20-n outputs an empty signal having an inactive level (e.g., "0") to the information assignment controller 19 when some data, which is included in one transport stream packet TS, written in the buffer memory is not read from the buffer memory. At this time, the information assignment controller 19 controls the reading controller to read a data in the buffer memory.

FIG. 8 shows a flowchart for explaining an operation according to the second embodiment of the present invention. For example, an operation for a channel 1 is explained hereinbelow.

The information assignment controller 19 disables an operation of reading data from the buffer memory section 20-1 by controlling the reading controller 16-1, and initializes the read and write addresses in the buffer memory 20-1, and initializes a content of the counter 17-1 to the number of subpackets in the transport stream packet (TS) (step S200).

Then, the information assignment controller 19 controls the writing controller 15-1 to write a packet information signal FP, which is outputted from the packet information selector 10, in the buffer memory 20-1 (step S201).

The information assignment controller 19 judges the continuation flag CF in the header information signal 9, to determine whether the packet information signal FP written in step S201 is contained in the last subpacket of the transmission frame (step S202). Clearly, step S202 is a step corresponding to the transmission frame when all subpackets except for the last one are missing (lost).

In step S202, if the image packet information signal FP written in step S201 is not contained in the last subpacket included in the transmission frame, the information assignment controller 19 controls the writing controller 15-1 to write the packet information signal FP, outputted from the packet information selector 10, to the buffer memory 20-1 (step S203).

Then, the information assignment controller 19 judges the continuation flag CF in the header information signal 9, to determine whether the packet information signal FP written in step S201 is contained in the last subpacket of the transmission frame (step S204).

In step S204, if the packet information signal FP written in step S203 is not included in the last subpacket, the information assignment controller 19 controls the reading controller 16-1 to read a packet information signal from the buffer memory 201 (step S205). The packet information signal read from the buffer memory 20-1 is outputted to the image processor 30-1. At this time, the value of counter 17-1 is decreased by one.

In steps S202 and S204, if the packet information signal FP written in the buffer memory 20-1 is included in the last subpacket, the information assignment controller 19 controls the reading controller 16-1 to read one packet information signal FP from the buffer memory 20-1 (step S206). The one packet signal read from the buffer memory 20-1 is outputted to the image processor 30-1. Accordingly, the counter 17-1 is decremented by one.

Then, the information assignment controller 19 judges whether the content of the counter 17-1 is zero (e.g., "0") (step S207).

If the content of the counter 17-1 is not zero, as determined in step S207, the information assignment controller 19 judges whether the buffer empty signal has an active level (e.g., a "1")(step S208).

In the step S208, if the buffer empty signal has an inactive level, the process returns back to step S206 to continue processing.

If the buffer empty signal has an active level, the information assignment controller 19 controls the writing controller 15-1 to write the dummy data in the buffer memory 20-1 (step S209). Then, the process returns back to step S206 to continue processing. In this embodiment, the dummy data never exists in the transport stream packet outputted by the packet multiplexer 1, and is just a signal for informing the image processor 30-1 about the subpacket loss.

In the step S207, if the content of the counter 17-1 is zero, the image processor 30-1 remakes the transport stream packet TS by combining the packet information signals FP outputted from the buffer memory 20-1, remakes the transport stream packet to a suitable form for an external device (e.g., display, monitor), and outputs a signal having the suitable form as an image output signal (1) in synchronization with the other image processors 30-2–30-n (packet synchronization)(step S210). If the image processor 30-1 receives the dummy data, the image processor 30-1 makes a special packet having the same shape as the transport stream packet TS by calculating the packet information signals FP except for the dummy data, thereby making almost (e.g., approximately) the same signal as the transport stream packet TS.

While processing of the packet information signal (1) is described above, the same processing is executed for the other packet information signals (2)–(n), simultaneously.

As mentioned above, the moving image communication system according to the second embodiment has the same advantages as the first embodiment.

Further, the moving image communication system according to the second embodiment executes the approximation operation by using the image processors 30-1–30-n. Therefore, a better image can be obtained than the image in the first embodiment.

Figure 9:
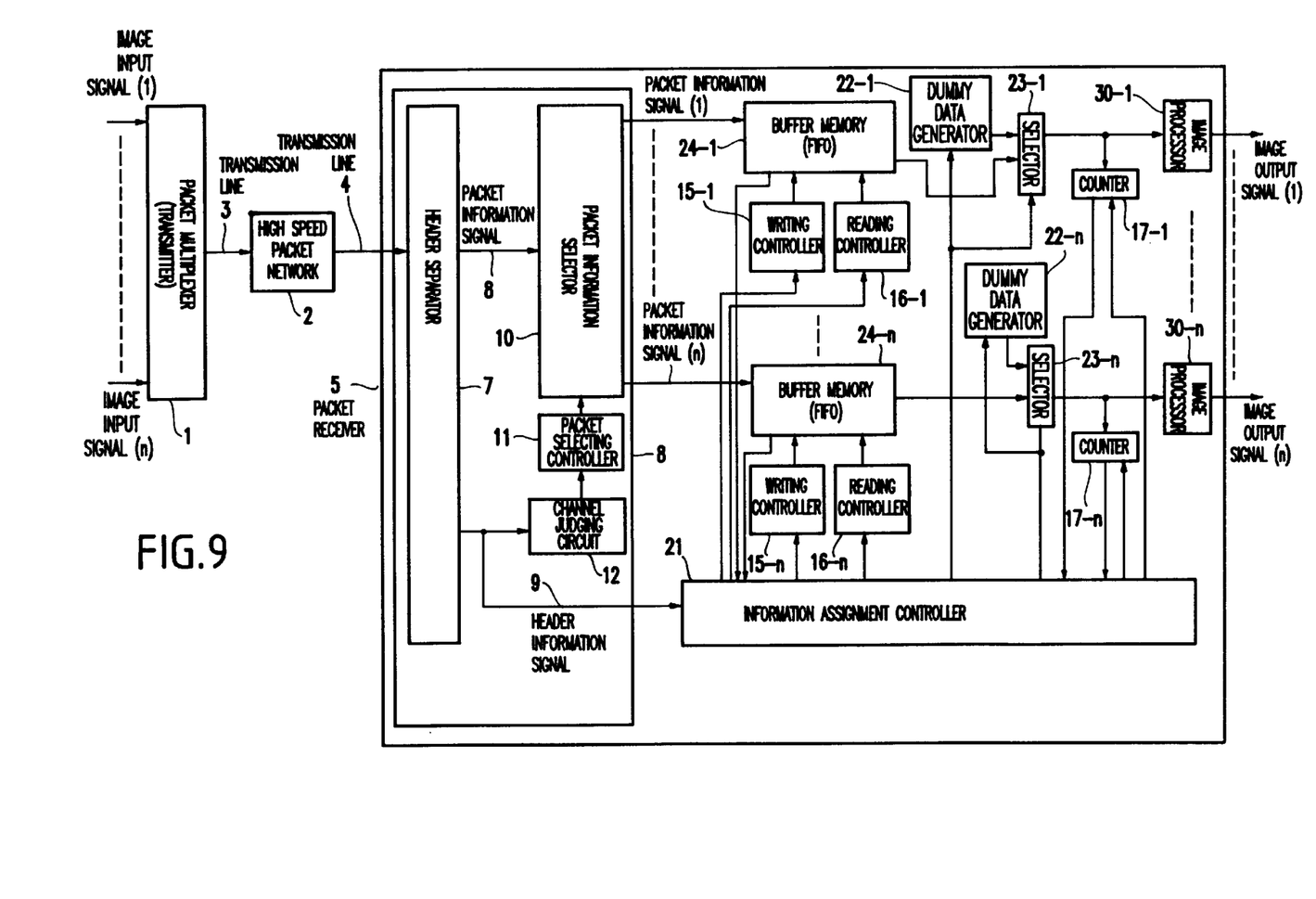
FIG. 9 illustrates a moving image communication system according to a third embodiment of the present invention.
Figure 10:
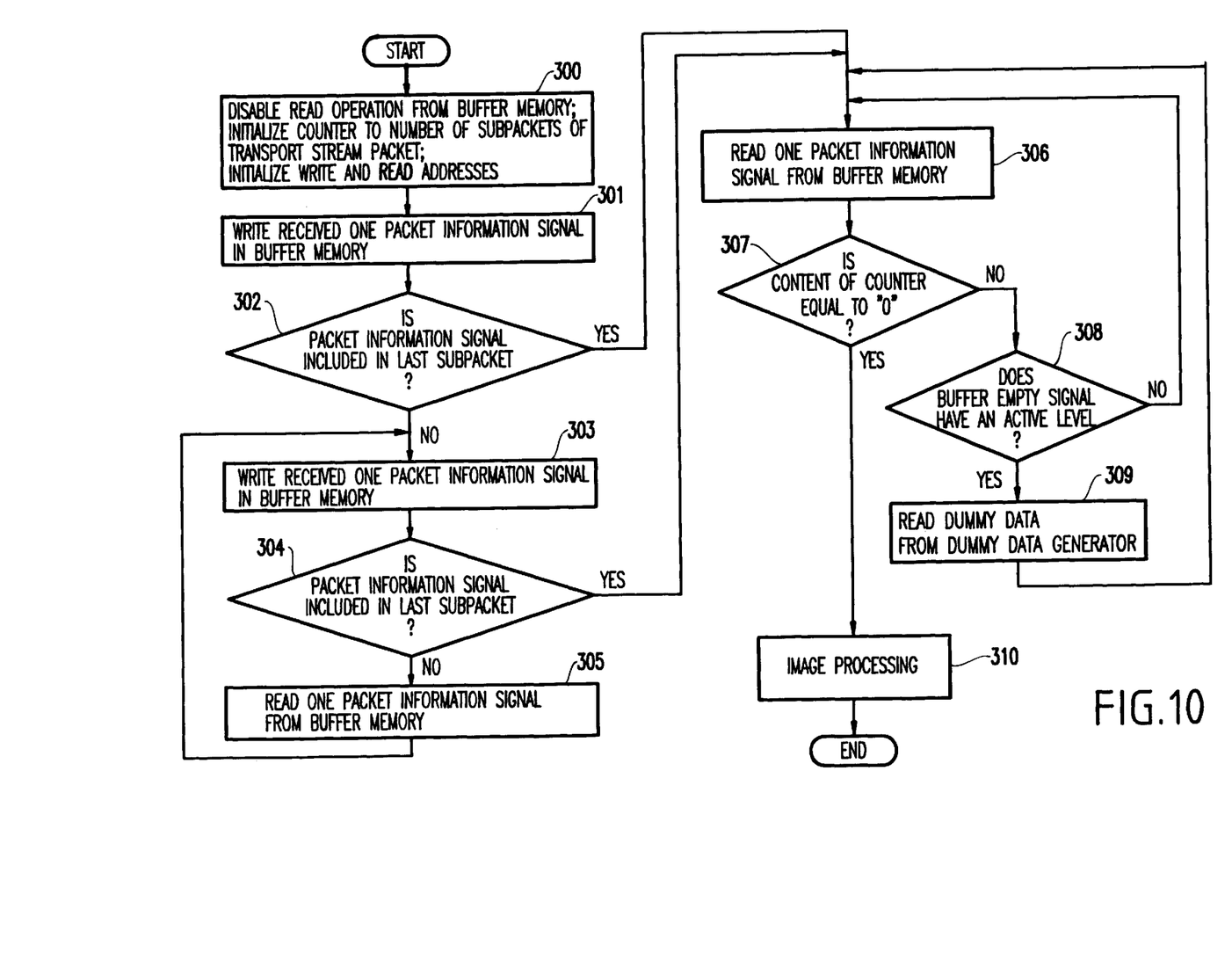
FIG. 10 is a flowchart for explaining the operation of the system shown in FIG. 9.

FIGS. 9 and 10 show the third embodiment of the present invention. The same parts in FIG. 9 as those in FIG. 7 are numbered with the same reference numerals in FIG. 7, and for brevity, explanations of these parts are omitted from the following description. As a packet, the same format shown in FIGS. 4(a)–4(c) is used in the third embodiment.

In FIG. 9, a respective buffer memory 24-1–24-n outputs a buffer empty signal having an active level (e.g., "1") to the information assignment controller 21 when all data, which is included in one transport stream packet TS, written in the buffer memory is read from the buffer memory. At this time, the information assignment controller 21 controls a selector 23-1–23-n to output a dummy data, which has a suitable form for the image processor to arrange the data approximately as the image output signal, from a dummy data generator 22-1–22-n.

Further, the respective buffer memory 24-1–24-n outputs an empty signal having an inactive level (e.g., "0") to the information assignment controller 21 when some data, which is included in one transport stream packet TS, written in the buffer memory is not read from the buffer memory. At this time, the information assignment controller 21 controls the selectors to output a data in the buffer memory.

FIG. 10 shows a flowchart for explaining an operation according to the third embodiment of the present invention. For example, an operation for a channel 1 is explained hereinbelow.

The information assignment controller 21 disables an operation for reading data from the buffer memory section 24-1 by controlling the reading controller 16-1, and initializes the read and write addresses in the buffer memory 24-1, and initializes a content of the counter 17-1 to the number of subpackets of the transport stream packet (TS) (step S300).

Then, the information assignment controller 21 controls the writing controller 15-1 to write a packet information signal FP, which is outputted from the packet information selector 10, in the buffer memory 24-1 (step S301).

The information assignment controller 21 judges the continuation flag CF in the header information signal 9, to determine whether the packet information signal FP written in step S301 is contained in the last subpacket of the transmission frame (step S302). Clearly, step S302 is a step corresponding to the transmission frame when all subpackets except for the last one are lost.

In step S302, if the image packet information signal FP written in step S301 is not contained in the last subpacket included in the transmission frame, the information assignment controller 21 controls the writing controller 15-1 to write the packet information signal FP, outputted from the packet information selector 10, to the buffer memory 24-1 (step S303).

Then, the information assignment controller 21 judges the continuation flag CF in the header information signal 9, to determine whether the packet information signal FP written in step S301 is contained in the last subpacket of the transmission frame (step S304).

In step S304, if the packet information signal FP written in step S303 is not included in the last subpacket, the information assignment controller 21 controls the reading controller 16-1 to read a packet information signal from the buffer memory 24-1 (step S305). The packet information signal read from the buffer memory 24-1 is outputted to the image processor 30-1. At this time, the counter 17-1 is decremented by one.

In steps S302 and S304, if the packet information signal FP written in the buffer memory 24-1 is included in the last subpacket, the information assignment controller 21 controls the reading controller 16-1 to read one packet information signal FP from the buffer memory 24-1 (step S306). The packet information signal read from the buffer memory 24-1 is outputted to the image processor 30-1. Accordingly, the counter 17-1 is decremented by one.

Then, the information assignment controller 21 judges whether the content of the counter 17-1 is zero (e.g., "0") (step S307).

If the content of the counter 17-1 is not zero, as determined in step S307, the information assignment controller 21 judges whether the buffer empty signal has an active level (e.g., a "1") (step S308).

In step S308, if the buffer empty signal has an inactive level, the process returns back to step S306 to continue processing.

If the buffer empty signal has an active level, the information assignment controller 21 controls the selector 23-1 to output the dummy data from the dummy data generator 22-1 (step S309). Then, the process returns back to step S306 to continue processing. In this embodiment, a writing operation by the writing controller 15-1 is unnecessary. Therefore, the access speed becomes faster than that of the second embodiment. Similarly to the second embodiment, the dummy data never exists in the transport stream packet outputted by the packet multiplexer 1, and is just a signal for informing the image processor 30-1 about the loss.

In step S307, if the content of the counter 17-1 is zero, the image processor 30-1 remakes the transport stream packet TS by combining the data outputted from the selector 23-1, remakes the transport stream packet to a suitable form for an extermal device (e.g., a display, monitor, etc.), and outputs a signal having the suitable form as an image output signal (1) in synchronization with the other image processors 30-2–30-n (packet synchronization)(step S310). If the image processor 30-1 receives the dummy data, the image processor 30-1 makes a special packet having the same shape as the transport stream packet TS by calculating the packet information signals FP except for the dummy data for making almost the same signal as the transport stream packet TS.

While processing of the packet information signal (1) is described above, the same processing is executed for the other packet information signals (2)–(n), simultaneously.

As mentioned above, the moving image communication system according to the third embodiment has the same advantages as those of the second embodiment.

Further, the moving image communication system according to the third embodiment does not require the buffer memory to write the dummy data, because there are provided the dummy data generators 22-1–22-n for storing the dummy data and the selectors 23-1–23-n for selecting data either of data outputted from the buffer memorys 24-1–24-n and the dummy data generators 22-1–22-n. Therefore, an access speed of the moving image communication system according to the third embodiment becomes faster than that of the second embodiment.

While the invention has been described in terms of several preferred embodiments, those skilled in the art will recognize that the invention can be practiced with modification within the spirit and scope of the appended claims.

Having thus described my invention, what I claim as new and desire to secure by Letters Patent is as follows:

1. An image communication system comprising:
   a transmitter for outputting a packet including a predetermined number of subpackets containing a first information and a second information; and
   a receiver for receiving said packet, wherein said receiver comprises:
   a memory for storing said first information;
   a counter for counting a number of said first information read out from said memory;
   an image processor for receiving said first information from said memory, and for generating an output signal of said receiver based on said first information; and
   a controller for controlling said image processor to output said output signal, when said counter counts said predetermined number.

2. The system as recited in claim 1, wherein said second information comprises information representing whether a subpacket among said predetermined number of subpackets is outputted by said transmitter as a last portion of said packet.

3. The system as recited in claim 2, wherein said controller receives said second information, controls to write said first information to said memory when said receiver receives said second information, and controls to read said first information from said memory when said second information includes said last portion.

4. The system as recited in claim 3, wherein said receiver further comprises:
   a separator for separating said packet into said first information and said second information, and for outputting said first information to said memory and said second information to said controller.

5. The system as recited in claim 4, wherein said memory outputs an empty signal to said controller when said memory outputs all of said first information, corresponding to said packet, stored in said memory.

6. The system as recited in claim 5, wherein said controller controls to write a dummy data to said memory, when said memory outputs said empty signal, and when said counter does not count said predetermined number.

7. The system as recited in claim 5, wherein said receiver further comprises:
   a dummy data generator for storing a dummy data; and
   a selector connected to said dummy data generator,
   wherein said controller controls said selector to output said dummy data outputted from said dummy data generator to said image processor, when said memory outputs said empty signal, and when said counter does not count said predetermined number, and
   wherein said controller controls said selector to output said first information outputted from said memory to said image processor, when said memory does not output said empty signal.

8. The system as recited in claim 6, wherein said second information comprises only one-bit information.

9. The system as recited in claim 7, wherein said second information comprises only one-bit information.

10. A receiver for image communication with a packet including a predetermined number of subpackets containing a first information and a second information, said receiver comprising:
    a memory for storing said first information;
    a counter for counting a number of said first information read out from said memory;
    an image processor for receiving said first information from said memory, and for generating an output signal of said receiver based on said first information; and
    a controller for controlling said image processor to output said output signal, when said counter counts said predetermined number.

11. The receiver as recited in claim 10, wherein said second information comprises information representing whether a subpacket among said predetermined number of subpackets comprises a last portion of said packet.

12. The receiver as recited in claim 11, wherein said controller receives said second information, controls to write said first information to said memory when said receiver receives said second information, and controls to read said first information from said memory when said second information indicates said last portion.

13. The receiver as recited in claim 12, further comprising:
    a separator for separating said packet into said first information and said second information, and for outputting said first information to said memory and said second information to said controller.

14. The receiver as recited in claim 13, wherein said memory outputs an empty signal to said controller when said memory outputs all of said first information, corresponding to said packet, stored in said memory.

15. The receiver as recited in claim 14, wherein said controller controls to write a dummy data to said memory, when said memory outputs said empty signal, and when said counter does not count said predetermined number.

16. The receiver as recited in claim 14, further comprising:
    a dummy data generator for storing a dummy data; and
    a selector connected to said dummy data generator,
    wherein said controller controls said selector to output said dummy data outputted from said dummy data generator to said image processor, when said memory outputs said empty signal, and when said counter does not count said predetermined number, and wherein said controller controls said selector to output said first information outputted from said memory to said image processor, when said memory does not output said empty signal.

17. A method for image communication with a packet including a predetermined number of subpackets containing a first information and a second information, comprising steps of:

receiving said packet;

storing said first information to a memory;

counting a number of said first information read out from said memory;

generating an output signal based on said first information read out from said memory; and outputting said output signal, when a number becomes said predetermined number in said counting step.

18. The method as recited in claim 17, further comprising a step of:

reading said first information from said memory when said second information indicates a last portion of said predetermined number of subpackets, is received in said receiving step.

19. The method as recited in claim 18, further comprising steps of:

generating an empty signal when said memory outputs all of said first information, corresponding to said packet, stored in said memory;

writing a dummy data to said memory, when said empty signal is generated, and when said predetermined number is not counted in said counting step.

* * * * *